(12) United States Patent
Kato et al.

(10) Patent No.: US 11,536,824 B2
(45) Date of Patent: Dec. 27, 2022

(54) DISTANCE MEASURING APPARATUS AND DISTANCE MEASURING SYSTEM

(71) Applicants: Kabushiki Kaisha Toshiba, Tokyo (JP); Toshiba Electronic Devices & Storage Corporation, Tokyo (JP)

(72) Inventors: Takayuki Kato, Kawasaki Kanagawa (JP); Shoji Ootaka, Yokohama Kanagawa (JP); Tsuneo Suzuki, Kamakura Kanagawa (JP); Masaki Nishikawa, Yokohama Kanagawa (JP); Katsuya Nonin, Kawasaki Kanagawa (JP); Hiroshi Yoshida, Yokohama Kanagawa (JP); Yoshiharu Nito, Yokohama Kanagawa (JP); Masayoshi Oshiro, Ota Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 345 days.

(21) Appl. No.: 16/811,195

(22) Filed: Mar. 6, 2020

(65) Prior Publication Data
US 2021/0088642 A1    Mar. 25, 2021

(30) Foreign Application Priority Data
Sep. 19, 2019   (JP) .............................. JP2019-170828

(51) Int. Cl.
*G01S 13/38*       (2006.01)
*G01S 13/34*       (2006.01)
(52) U.S. Cl.
CPC ............ *G01S 13/38* (2013.01); *G01S 13/342* (2013.01); *G01S 13/347* (2013.01)

(58) Field of Classification Search
CPC ....... G01S 13/38; G01S 13/342; G01S 13/347
See application file for complete search history.

(56) References Cited

U.S. PATENT DOCUMENTS 7,483,714 B2    1/2009 Tanaka et al.
7,529,551 B2    5/2009 Tanaka et al.
(Continued)

FOREIGN PATENT DOCUMENTS

JP              3649404 B2    5/2005
JP         2012-137478 A      7/2012
(Continued)

OTHER PUBLICATIONS

Extended European Search Report dated Nov. 12, 2020, corresponding to European Patent Application No. 20175171.6.

*Primary Examiner* — Marcus E Windrich
(74) *Attorney, Agent, or Firm* — Allen & Overy LLP

(57) ABSTRACT

A distance measuring apparatus according to an embodiment includes, a filter section configured to perform band limitation on a transmission signal and output the transmission signal, and to perform band limitation on a reception signal from an antenna section and output the reception signal, a distance measuring section configured to perform a distance measurement computation based on the transmission signal and the reception signal, and to obtain a delay of a signal passing through the filter section and perform calibration of the distance measurement computation, a signal interruption section configured to interrupt transmission of a signal between the filter section and the antenna section, and a control section configured to control the signal interruption section to interrupt the transmission of the signal during a period of the calibration.

12 Claims, 13 Drawing Sheets

(56) References Cited

U.S. PATENT DOCUMENTS

| | | | |
|---|---|---|---|
| 2003/0016174 A1* | 1/2003 | Anderson | G01S 5/0284 |
| | | | 342/378 |
| 2008/0143583 A1 | 6/2008 | Welle et al. | |
| 2009/0058716 A1 | 3/2009 | Thomas et al. | |
| 2010/0093289 A1* | 4/2010 | Nash | H03F 3/189 |
| | | | 455/101 |
| 2015/0177371 A1* | 6/2015 | Abbasi | G01S 13/88 |
| | | | 342/174 |
| 2018/0267154 A1 | 9/2018 | Ootaka et al. | |
| 2021/0063447 A1* | 3/2021 | Eaves | G01R 19/16528 |
| 2022/0123602 A1* | 4/2022 | Cook | H02J 50/60 |

FOREIGN PATENT DOCUMENTS

| | | |
|---|---|---|
| JP | 2018-155724 A | 10/2018 |
| JP | 2018-194328 A | 12/2018 |
| JP | 2018-194329 A | 12/2018 |

\* cited by examiner

*PRIOR ART*

US 11,536,824 B2

DISTANCE MEASURING APPARATUS AND DISTANCE MEASURING SYSTEM

CROSS-REFERENCE TO RELATED APPLICATION

This application is based upon and claims the benefit of priority from the prior Japanese Patent Application No. 2019-170828 filed in Japan on Sep. 19, 2019; the entire contents of which are incorporated herein by reference.

FIELD

Embodiments described herein relate generally to a distance measuring apparatus and a distance measuring system.

BACKGROUND

In recent years, keyless entry for facilitating locking and unlocking of a car has been adopted in many cars. This technique performs locking and unlocking of a door using communication between a key of an automobile and the automobile. Further, in recent years, a smart entry system that makes it possible to perform, with a smart key, locking and unlocking of a door lock and start an engine without touching a key has been also adopted.

However, a lot of incidents occur in which an attacker intrudes into communication between a key and an automobile and steals the automobile. As measures against the attack (so-called relay attack), a measure for measuring a distance between the key and the automobile and, when determining that the distance is equal to or larger than a predetermined distance, prohibiting control of the automobile by the communication has been examined.

As a system that performs distance measurement as described above, a communication type distance measuring system is used in which a phase detection system is adopted and a distance between apparatuses is obtained through wireless communication.

However, in a distance measuring apparatus in which the phase detection system is adopted, there is a problem that in the case where an influence of a phase delay in an apparatus of an RF filter, etc. is large, distance measurement cannot be accurately performed in some cases.

DETAILED DESCRIPTION

A distance measuring apparatus according to embodiments includes a transmission processing section configured to output a transmission signal, an antenna section configured to transmit the transmission signal and receive a reception signal, a reception processing section configured to receive the reception signal or the transmission signal, a filer section configured to perform band limitation on the transmission signal input from one terminal and output the transmission signal from another terminal, and to perform band limitation on the reception signal from the antenna section input from the other terminal and output the reception signal from the one terminal, a distance measuring section configured to perform a distance measurement computation based on the transmission signal transmitted from the transmission processing section and the reception signal received by the reception processing section, and to obtain a delay of a signal passing through the filter section and perform calibration of the distance measurement computation, a signal interruption section configured to interrupt transmission of a signal between the other terminal of the filter section and the antenna section, and a control section configured to control the signal interruption section to interrupt the transmission of the signal between the antenna section and the other terminal of the filter section during a period of the calibration.

Hereinafter, embodiments of the present invention will be described in detail with reference to the accompanying drawings.

First Embodiment

Figure 1:
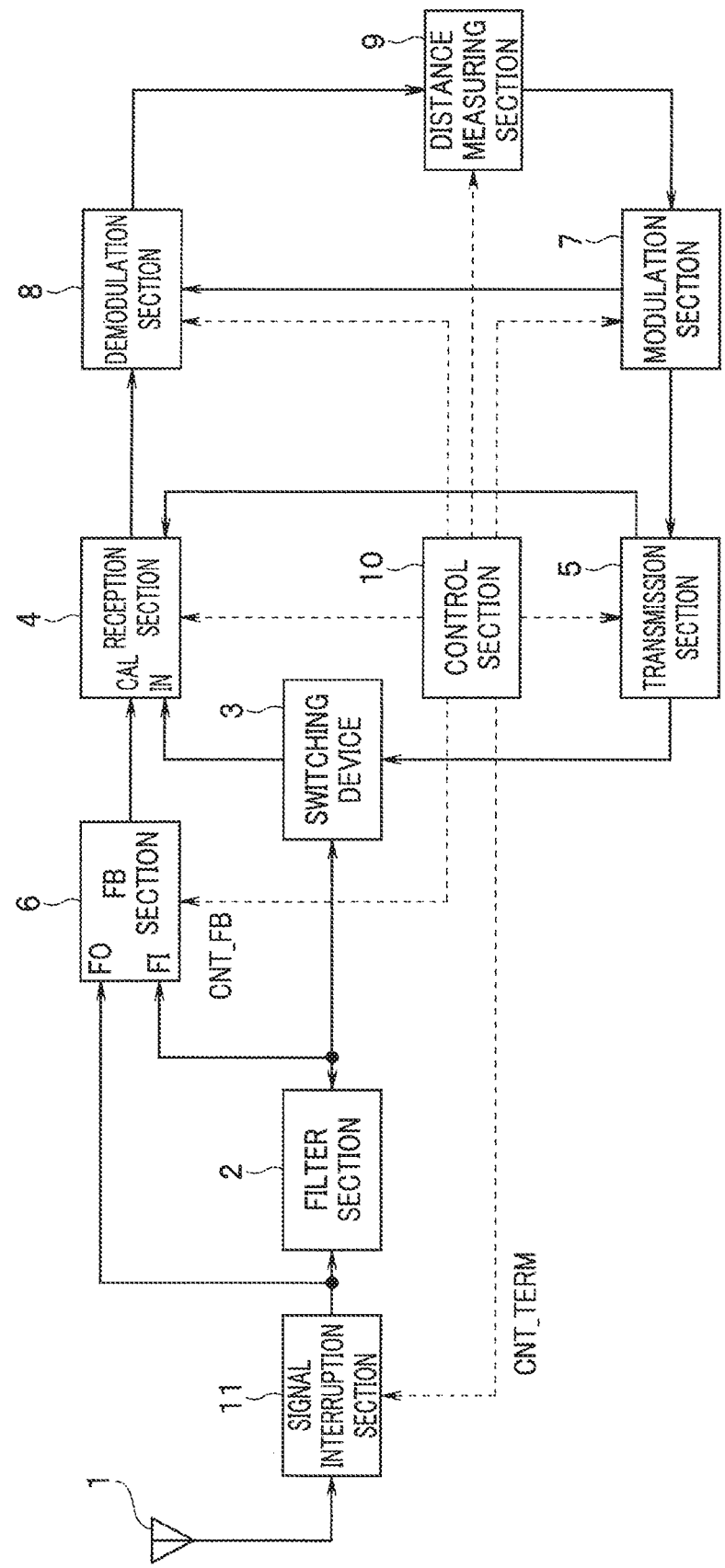
FIG. 1 is a block diagram showing a distance measuring apparatus according to a first embodiment of the present invention.
Figure 2:
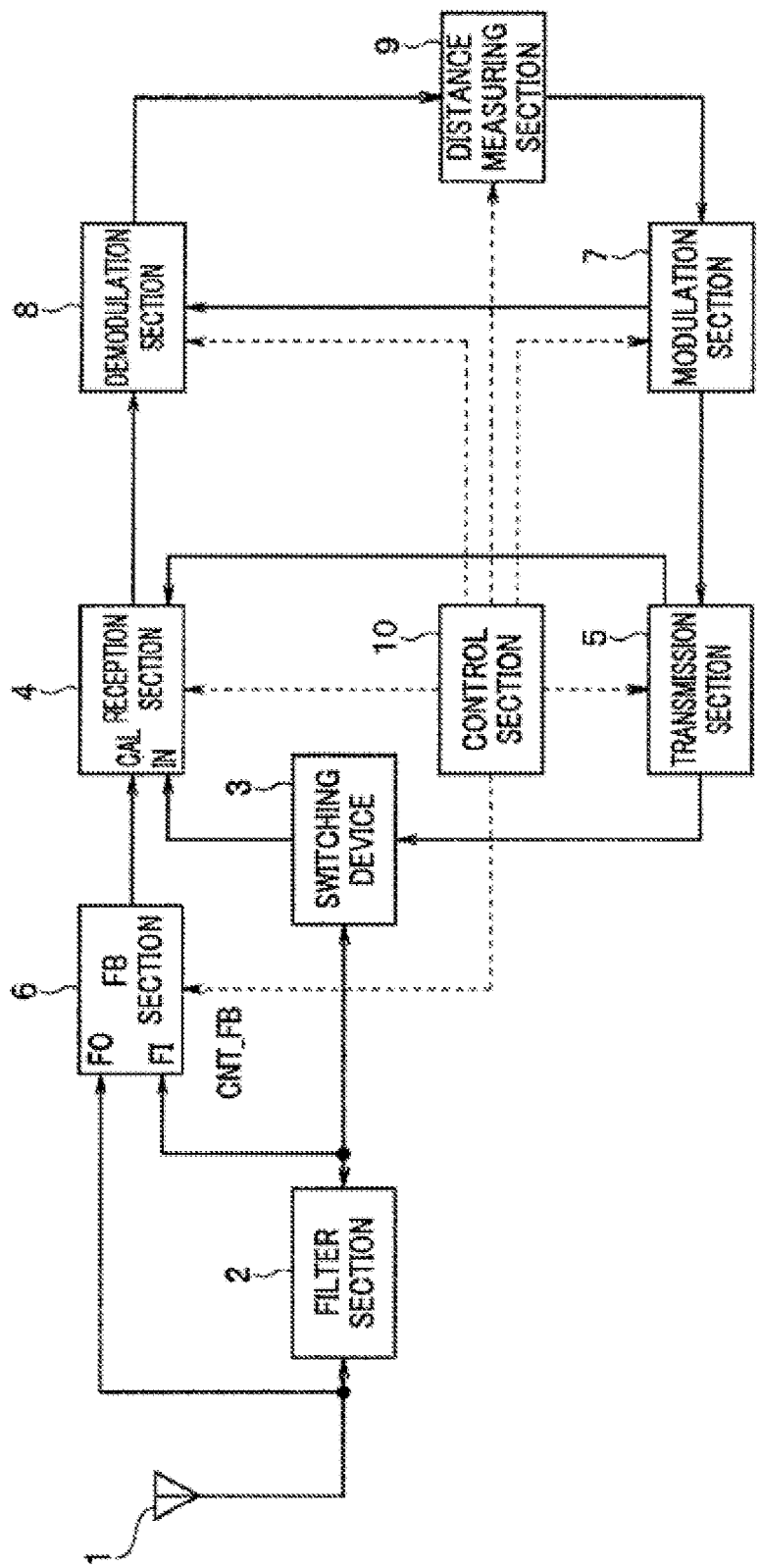
FIG. 2 is a block diagram showing related technology of the distance measuring apparatus.

FIG. 1 is a block diagram showing a distance measuring apparatus according to a first embodiment of the present invention. Further, FIG. 2 is a block diagram showing related technology of the distance measuring apparatus, and is a diagram describing the distance measuring apparatus disclosed in Japanese Patent Application Laid-Open Publication No. 2018-155724 (hereinafter, referred to as a document 1). According to the present embodiment, an influence of an interfering wave is avoided at the time of calibration for removing a delay phase in the apparatus to thereby perform an accurate distance measurement. According to the present embodiment, an example in which there is adopted a communication type distance measurement in which a phase detection system using a non-modulated carrier is adopted will be described.

In FIGS. 1 and 2, the same components are denoted by the same reference numerals, and redundant description of those components is omitted. FIGS. 1 and 2 show a configuration of a wireless section that realizes a filter delay calibration of the distance measuring apparatus.

First, the calibration of the related technology disclosed in the document 1 will be described with reference to FIG. 2.

In the distance measuring apparatus disclosed in the document 1, a phase distance measurement technique is adopted in which a carrier of a predetermined frequency is transmitted and a propagation phase delay is detected in response to a propagation distance on the reception side to thereby measure a distance. In order to measure a distance between two apparatuses, in the apparatus disclosed in the document 1, a role for a transmission and reception is interchanged in a predetermined time interval and sine waves of a plurality of frequencies are transmitted and received. On this occasion, in order to accurately obtain the distance between the two apparatuses, it is necessary to separate a delay present within each apparatus and a propagation delay between the two apparatuses.

The document 1 discloses that as a delay present inside each of the apparatuses, a delay in an RF filter having a large delay is particularly measured by each of the apparatuses and the delay phase is subtracted from the measured phase to thereby obtain a propagation distance between the two apparatuses. However, by using a technique disclosed in the document 1, a delay in an RF filter cannot accurately be measured depending on a radio wave environment of each of the apparatuses in some cases. Hereinafter, the above-described problem will be described in detail.

A radio section shown in FIG. 2 includes a control section 10 configured to control each section in the radio section. The control section 10 may be configured by a processor using a CPU (Central Processing Unit), an FPGA (Field Programmable Gate Array), and the like. Alternatively, the control section 10 may operate in accordance with a program stored in a memory (not shown) and control each section, or may realize a part or all of functions in an electronic circuit of hardware.

An antenna section 1 configured to transmit and receive a radio signal is connected to an external terminal of the filter section 2 and an internal terminal of the filter section 2 is connected to a reception section 4 and a transmission section 5 via a switching device 3. The filter section 2 is an RF filter that allows a band of a distance measuring signal to pass. Either of the external terminal and the internal terminal of the filter section 2 is connected to a feedback section (FB section) 6. The FB section 6 includes an FO terminal connected to the external terminal of the filter section 2 and an FI terminal connected to the internal terminal of the filter section 2. The FB section 6 is controlled by the control section 10, selects one of the FO terminal and the FI terminal, and selectively outputs a signal input to the FO terminal or a signal input to the FI terminal to the reception section 4.

Figure 3:
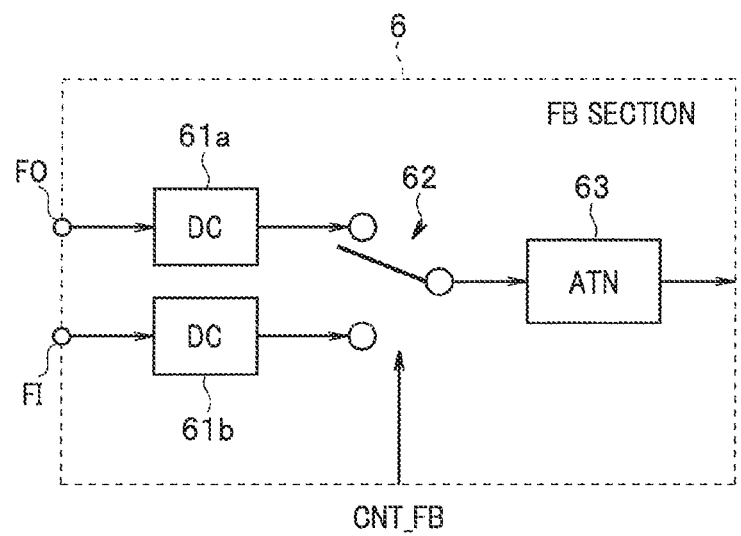
FIG. 3 is a block diagram showing an example of a specific configuration of an FB section 6 shown in FIGS. 1 and 2.

FIG. 3 is a block diagram showing an example of a specific configuration of the FB section 6 shown in FIGS. 1 and 2. The external terminal of the filter section 2 is connected to the FO terminal of the FB section 6 and the internal terminal of the filter section 2 is connected to the FI terminal of the FB section 6. The FO terminal is connected to a directional coupler (DC) 61a and the FI terminal is connected to a directional coupler 61b. The directional couplers 61a and 61b respectively transfer a signal from the FO terminal or the F terminal to a three-terminal switch 62. The three-terminal switch 62 selects one output from the directional couplers 61a and 61b and outputs the signal to an attenuator (ATN) 63 in accordance with a control signal CNT_FB imparted from the control section 10. The attenuator 63 attenuates the input signal and outputs the attenuated signal to the reception section 4.

A distance measuring section 9 generates the distance measuring signal in a phase detecting system. For example, the distance measuring section 9 may output digital data for generating a sine wave as the distance measuring signal. To the distance measuring section 9, a phase detection result of the distance measuring signal received via the antenna section 1 is imparted. Further, the distance measuring section 9 calculates a distance between the apparatus itself and the other apparatus by using the phase detection result of the transmitted distance measuring signal and a distance measurement computation with respect to the phase detection result obtained from the reception signal.

The distance measuring section 9 supplies a signal for generating the distance measuring signal to a modulation section 7. The modulation section 7 is controlled by the control section 10, and generates the distance measuring signal and outputs the signal as a transmission signal to the transmission section 5. Note that, at the time of the distance measurement, the modulation section 7 outputs a non-modulated transmission signal. The transmission section 5 includes a synthesizer section including an oscillator to be described later. Further, the transmission section 5 is controlled by the control section 10, converts a transmission signal from the modulation section 7 to a high frequency signal by using a local signal and outputs the high frequency signal to the switching device 3.

Figure 4:
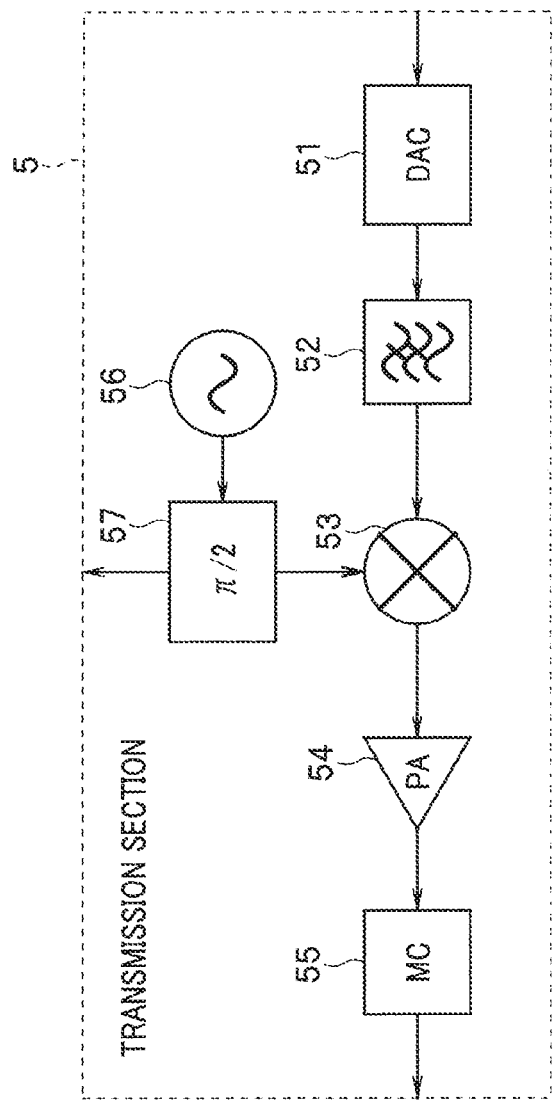
FIG. 4 is a circuit diagram showing an example of a specific configuration of a transmission section 5 shown in FIGS. 1 and 2.

FIG. 4 is a circuit diagram showing an example of a specific configuration of the transmission section 5 shown in FIGS. 1 and 2. A DAC (digital analog converter) 51 of the transmission section 5 converts a digital transmission signal input from the modulation section 7 into an analog signal and outputs the analog signal to a low-pass filter 52. The low-pass filter 52 removes an alias distortion included in an output of the DAC 51 and outputs the signal to an image suppression mixer 53. The synthesizer 56 generates a local signal (LO signal) having a local frequency and outputs the local signal to a phase shifter 57. The phase shifter 57 changes a phase of the LO signal by $\pi/2$ and generates an LO signal orthogonal to the LO signal and outputs the two LO signals orthogonal to each other. The phase shifter 57 imparts the LO signal to the image suppression mixer 53. Although shown by one line in the figure, two LO signals in which the phases thereof are shifted each other by $\pi/2$.

By multiplying the output of the low-pass filter 52 and the LO signal together, the image suppression mixer 53 frequency-converts the output of the low-pass filter 52 and outputs the signal to a power amplifier (PA) 54. The power amplifier 54 amplifies an output signal from the image suppression mixer 53 and imparts the amplified output signal to a matching circuit (MC) 55. The matching circuit 55 performs power matching for efficiently transmitting an output of the power amplifier 54 to the antenna section 1.

The switching device 3 imparts a transmission signal from the transmission section 5 to the filter section 2, and at the same time imparts a reception signal from the filter section 2 to the reception section 4. To the reception section 4, the two orthogonal LO signals are imparted from the transmission section 5. The reception section 4 converts the reception signal to a baseband signal by using the LO signal and outputs the baseband signal to a demodulation section 8.

Figure 5:
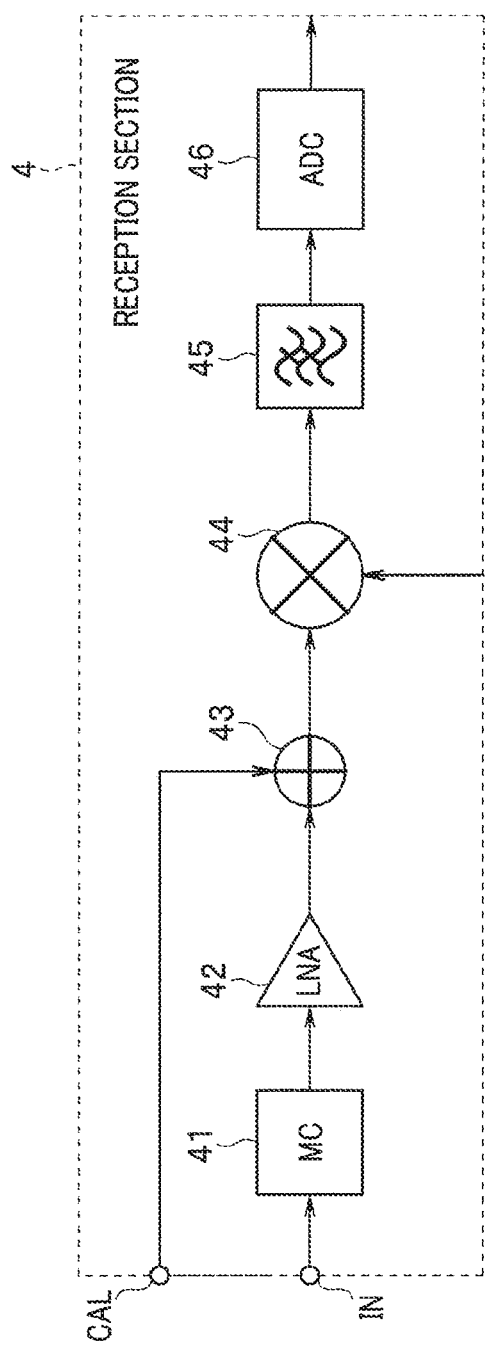
FIG. 5 is a circuit diagram showing an example of a specific configuration of a reception section 4 shown in FIGS. 1 and 2.

FIG. 5 is a circuit diagram showing an example of a specific configuration of the reception section 4 shown in FIGS. 1 and 2. The reception signal from the switching device 3 is input to a terminal IN of the reception section 4 and an output of the FB section 6 is input to a terminal CAL.

A matching circuit (MC) 41 performs power matching of a signal from the filter section 2 and imparts the signal to a low noise amplifier (LNA) 42. The low noise amplifier 42 amplifies the input signal with low noises and outputs the amplified signal to an adder 43. An output of the low noise amplifier 42 and a signal at the time of calibration input via the terminal CAL are imparted to the adder 43. The adder 43 adds two inputs and outputs the added input to an image suppression mixer 44. Note, however, that signals are not ideally input at the same time.

To the image suppression mixer 44, the LO signal is imparted from the transmission section 5. Then, the image suppression mixer 44 frequency-converts an RF (high frequency) signal from the adder 43 to the baseband signal by using the LO signal and outputs the baseband signal to the low-pass filter 45. The low-pass filter 45 removes the alias distortion caused at the time of sampling by an ADC (analog digital converter) 46 from the output of the image suppression mixer 44 and outputs the signal to the ADC 46. The ADC 46 converts the input analog signal to a digital signal and outputs the digital signal to the demodulation section 8.

The demodulation section 8 demodulates the reception signal and acquires reception information including phase information. The demodulation section 8 outputs the phase information about the reception signal to the distance measuring section 9. The distance measuring section 9 performs the distance measurement computation based on the phase information about a distance measuring signal to be transmitted and the phase information about the received distance measuring signal.

A delay phase of the filter section 2 is included in a phase used for the distance measurement computation in the distance measuring section 9. In order to perform an accurate distance measurement, it is necessary to remove the delay phase of the filter section 2 from a measurement phase. In an example shown in FIG. 2, a delay between a path passing through the filter section 2 and a path not passing through the filter section 2 is measured by using the FB section 6. Thereby, a delay of the filter section 2 is obtained and the calibration is performed.

At the time of the calibration, the distance measuring section 9 generates the same sine wave etc. as the sine wave of the calibration signal for obtaining the delay of the filter section 2, for example, the distance measuring signal. The modulation section 7 outputs the transmission signal to the transmission section 5 based on an output of the distance measuring section 9. The transmission section 5 performs a frequency conversion and outputs a sine wave of a frequency $f_L$. The FB section 6 selects the FO terminal by the control signal CNT_FB from the control section 10. Specifically, in the case, the sine wave of the frequency $f_L$ output from the transmission section 5 passes through the switching device 3 and the filter section 2 and is input to the reception section 4 via the FO terminal of the FB section 6. Note that it is supposed that the transmission signal from the transmission section 5 is not directly received by the reception section 4 via the switching device 3.

The reception section 4 converts the sine wave of the frequency $f_L$ to the baseband signal and imparts the baseband signal to the demodulation section 8. Then, the demodulation section 8 outputs the phase information about the calibration signal (sine wave) after the demodulation to the distance measuring section 9. For example, the demodulation section 8 may output I and Q signals as a demodulation result by using the orthogonal local signal. A signal path from the above-described distance measuring section 9 through the modulation section 7, the transmission section 5, the switching device 3, the filter section 2, the FB section 6, the reception section 4, and the demodulation section 8 is supposed to be a calibration path A. The same oscillator is used in the transmission and reception of a signal output by the distance measuring section 9. Therefore, a synchronization between the transmission signal and the reception signal is taken in the distance measuring section 9 and a delay phase of the entire calibration path A can be measured by the distance measuring section 9.

Here, a delay phase due to the modulation section 7 and the transmission section 5 configuring the transmission processing section is supposed to be $\theta_{TX}$, a delay phase due to the reception section 4 and the demodulation section 8 configuring the FB section 6 and the reception processing section is supposed to be $\theta_{RX}$, and the delay phase of the filter section 2 is supposed to be $\theta_{BPF}$. A delay phase $\theta_{pathA}$ of the calibration path A is represented by the following equation (1).

$$\theta_{pathA} = \theta_{TX} + \theta_{BPF} + \theta_{RX} \quad (1)$$

Next, the FB section 6 selects the FI terminal by the control signal CNT_FB. In the case, the sine wave of the frequency $f_L$ output from the transmission section 5 is supplied from the switching device 3 to the reception section 4 via the FI terminal of the FB section 6. The reception section 4 converts the sine wave of the frequency $f_L$ to the baseband signal and imparts the baseband signal to the demodulation section 8. Then, the demodulation section 8 outputs the phase information about the calibration signal (sine wave) after the demodulation to the distance measuring section 9. A signal path from the above-described distance measuring section 9 through the modulation section 7, the transmission section 5, the switching device 3, the FB section 6, the reception section 4, and the demodulation section 8 is supposed to be a calibration path B. The distance measuring section 9 receives the output signal through the calibration path B. Therefore, the synchronization between the transmission signal and the reception signal is taken in the distance measuring section 9 and a delay phase of the entire calibration path B can be measured in the distance measuring section 9. The delay phase $\theta_{pathB}$ of the calibration path B is represented by the following equation (2).

$$\theta_{pathB} = \theta_{TX} + \theta_{RX} \quad (2)$$

A difference between equation (1) and equation (2) is taken and the following equation (3) is obtained. On the basis of equation (3), it is understood that the delay phase of the filter section 2 can be detected. A delay phase represented by equation (3) is subtracted from a detection phase obtained by the distance measuring section 9 to thereby perform an accurate distance measurement.

$$\theta_{pathA} - \theta_{pathB} = \theta_{BPF} \quad (3)$$

However, by the above-described technique, an accurate distance measurement cannot be performed, in some cases, by an influence of interfering waves (interference waves) mixed via the antenna section 1.

Figure 6:
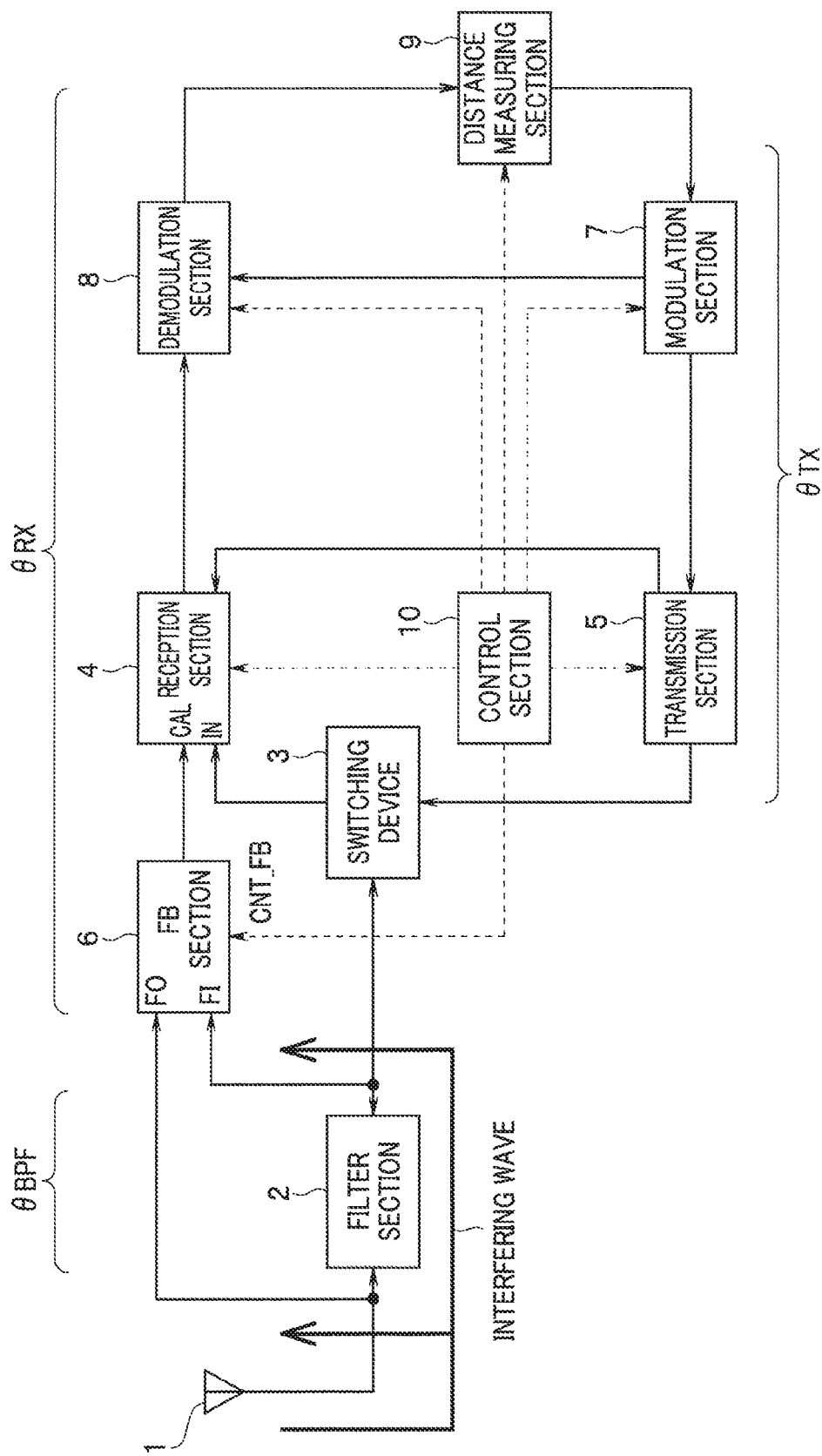
FIG. 6 is an explanatory diagram describing the problem in an apparatus shown in FIG. 2.

FIG. 6 is an explanatory diagram describing the above problem in the apparatus shown in FIG. 2. An interfering wave shown in a heavy line is mixed into the antenna section 1 and the interfering wave is directly input to the FO terminal of the FB section 6 or the FI terminal of the FB section 6 via the filter section 2. In the case, when the calibration is performed by the above procedure, a signal in which the interfering wave and the sine wave of the frequency $f_L$ that is the calibration signal are added to each other is received by the reception section 4. When the interfering wave has a frequency in a filter band, the interfering wave is input in the FI terminal of the reception section 4 via the filter section 2.

Since an interfering wave signal is added to the reception signal of the reception section 4, a phase observed by the distance measuring section 9 cannot be represented by the above equations (1) and (2). For example, it is supposed that the signal is a signal in which a frequency of the interfering wave that passes through the demodulation section 8 is the frequency $f_L$ shifted by $\Delta f_I$, an amplitude ratio between the signal and the calibration signal is $A_I$, and in the case where the interfering wave is not present, a demodulation result of the demodulation section 8 is $(I_S, Q_S)$. In the case, $(I, Q)$ of the reception signal is represented by the following equation (4).

$$(I,Q)=(I_S+A_I\cos(-2\pi\Delta f_I)t, Q_S+A_I\sin(-2\pi\Delta f_I)t) \quad (4)$$

Here, an equation $I_S^2+Q_S^2=1$ holds. From the above equation (4), the detected phase $\theta_{det\_int}$ is represented by the following equation (5).

$$\theta_{det\_int}=\tan^{-1}(Q_S+A_I\sin(-2\pi\Delta f_I)t)/(I_S+A_I\cos(-2\pi\Delta f_I)t) \quad (5)$$

In a case where the interfering wave is not present, the following equation (6) holds in the detected phase $\theta_{det}$.

$$\theta_{det}=\tan^{-1}(Q_S/I_S) \quad (6)$$

Obviously, an expression $\theta_{det\_int} \neq \theta_{det}$ holds. Accordingly, the delay phase of the filter section 2 cannot be obtained by the calibration, and as a result, the distance cannot accurately be measured.

To solve the above problem, according to the present embodiment, a signal interruption section 11 is provided. In FIG. 1, the signal interruption section 11 is provided between the antenna section 1 and the filter section 2. The signal interruption section 11 is controlled by the control section 10, interrupts a connection between the antenna section 1 and the filter section 2, and prevents the interfering wave mixed from the antenna section 1 from being output to the filter section 2 side.

Figure 7:
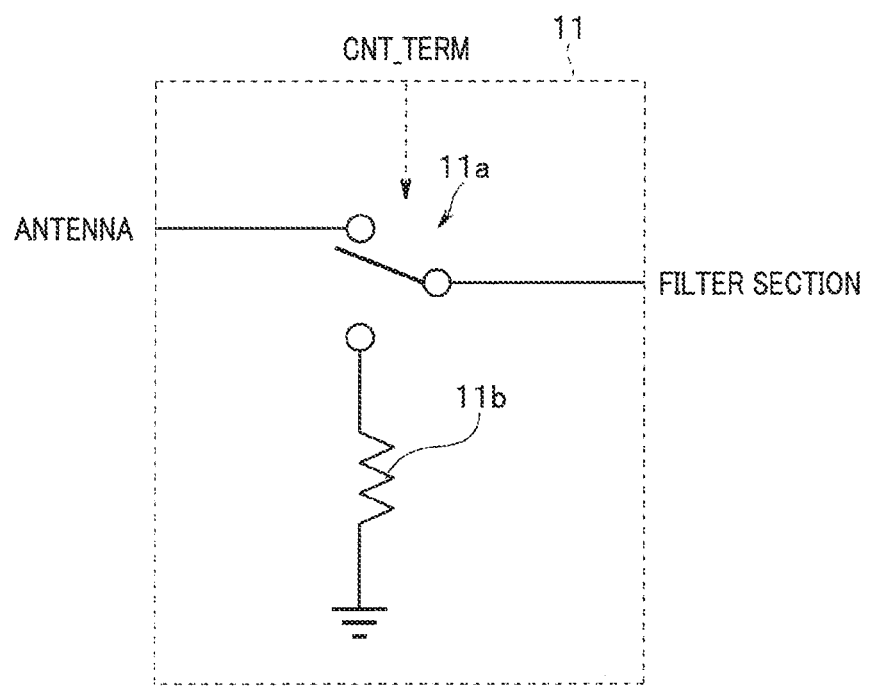
FIG. 7 is a circuit diagram showing an example of a specific configuration of a signal interruption section 11 shown in FIG. 1.

FIG. 7 is a circuit diagram showing an example of a specific configuration of the signal interruption section 11 shown in FIG. 1. The signal interruption section 11 shown in FIG. 7 is configured by a three-terminal switch 11a and a terminator 11b. One terminal of the three-terminal switch 11a is connected to the antenna section 1, the other terminal is connected to a reference potential point via the terminator 11b, and a common terminal is connected to the filter section 2. Note that the terminator 11b may be constituted, for example, by a resistor of 50Ω in which an antenna impedance is considered.

The three-terminal switch 11a is controlled by a control signal CNT_TERM from the control section 10 and selectively connects the common terminal to one terminal of the antenna section 1 or the terminator 11b. The control section 10 controls the three-terminal switch 11a by the control signal CNT_TERM, selects an antenna input and supplies the antenna input to the filter section 2 at the time of a normal reception, and selects the terminator 11b and terminates the external terminal of the filter section 2 at the time of the calibration.

Figure 8:
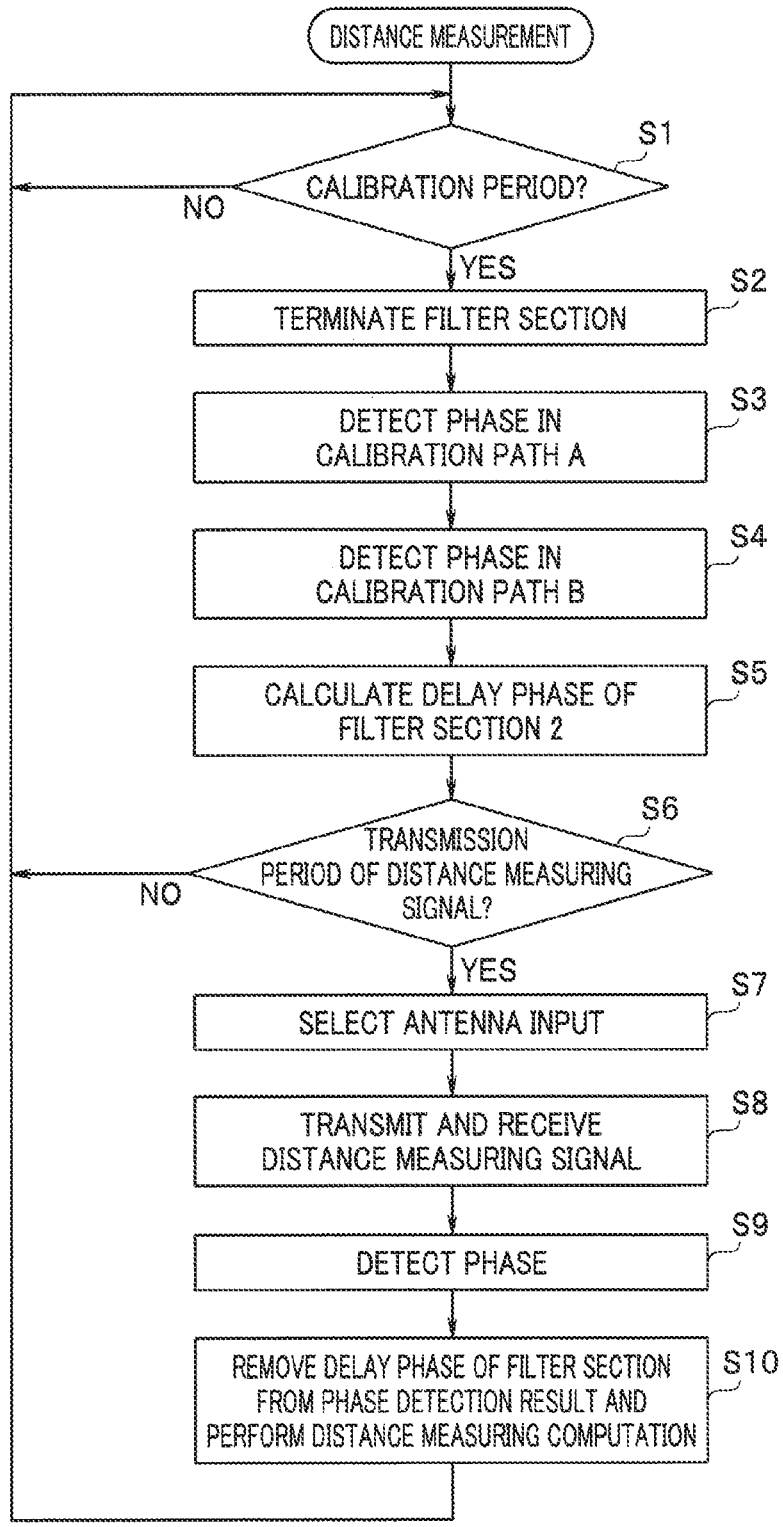
FIG. 8 is a flowchart describing operations according to the first embodiment.

Next, operations according to the embodiment configured as described above will be described with reference to FIG. 8. FIG. 8 is a flowchart describing the operations according to the first embodiment.

The control section 10 performs the calibration at a predetermined timing on the occasion of the distance measurement. The control section 10 determines whether or not the period is a calibration period in step S1 of FIG. 8 and determines whether or not the period is a transmission period of the distance measuring signal in step S6. During the calibration period, in step S2, the control section 10 imparts the control signal CNT_TERM to the signal interruption section 11 and causes the common terminal of the three-terminal switch 11a to connect with the terminator 11b. Thereby, the filter section 2 is terminated by the terminator 11b and a signal (interfering wave) received by the antenna section 1 is not input to the filter section 2 and the FB section 6.

In the state, the control section 10 causes the distance measuring section 9 to perform a phase detection using the calibration path A in step S3. In other words, the control section 10 imparts the control signal CNT_FB to the FB section 6 to cause the FB section 6 to select the FO terminal and causes the distance measuring section 9 to output the predetermined calibration signal. The calibration signal is supplied from the modulation section 7 to the transmission section 5 to be converted to an RF signal, and then is input to the FB section 6 via the switching device 3 and the filter section 2. The FB section 6 takes in a signal output from the external terminal of the filter section 2 via the FO terminal and outputs the signal to the reception section 4. The reception signal input to the reception section 4 is converted to the baseband signal by using the IO signal used by the transmission section 5, and then is supplied to the demodulation section 8. The demodulation section 8 demodulates the reception signal and outputs the phase information to the distance measuring section 9. The distance measuring section 9 detects a phase of the reception signal based on a phase of the transmitted calibration signal.

Next, the control section 10 causes the distance measuring section 9 to perform a phase detection using the calibration path B in step S4. In other words, the control section 10 imparts the control signal CNT_FB to the FB section 6 to cause the FB section 6 to select the FI terminal and causes the distance measuring section 9 to output the calibration signal. The calibration signal is supplied from the modulation section 7 to the transmission section 5 to be converted to an RF signal, and then is input to the FB section 6 via the switching device 3. The FB section 6 takes in the transmission signal via the FI terminal connected to the internal terminal of the filter section 2 and outputs the transmission signal to the reception section 4. The reception section 4 converts the reception signal to the baseband signal and then imparts the baseband signal to the demodulation section 8. The demodulation section 8 imparts the phase information about the reception signal to the distance measuring section 9. The distance measuring section 9 detects the phase of the reception signal based on the phase of the transmitted calibration signal.

In step S5, the control section 10 causes the distance measuring section 9 to calculate the delay phase of the filter section 2. The delay phase of the filter section 2 is obtained by a difference between a phase detection result using the calibration path A and a phase detection result using the calibration path B. At the time of the phase detection using the calibration path A and at the time of the phase detection using the calibration path B, an antenna input from the antenna section 1 is prevented by the signal interruption section 11 and is not input to the FB section 6.

Accordingly, an equation $A_I=0$ holds, and therefore $\theta_{det\_int}$ in the above equation (5) matches with $\theta_{det}$ in the above equation (6). In other words, an influence by the interfering wave can be removed and the delay phase of the filter section 2 can be accurately obtained.

During the transmission period of the distance measuring signal, the control section 10 imparts the control signal CNT_TERM to the signal interruption section 11 and causes the common terminal of the three-terminal switch 11a to connect with the antenna section 1 in step S7. Thereby, the filter section 2 is connected to the antenna section 1. Further, the control section 10 imparts the control signal CNT_FB to the FB section 6, does not cause the FB section 6 to select the FO terminal and the FI terminal, and prevents the antenna input from the FB section 6 to the reception section 4.

In the state, the control section 10 performs transmission and reception of the distance measuring signal (step S8). The distance measuring signal from the distance measuring section 9 is supplied from the modulation section 7 to the transmission section 5 and is converted to an RF signal. Then, the RF signal is supplied to the antenna section 1 via the switching device 3 and the filter section 2 and is transmitted to the other apparatus. On the other hand, the distance measuring signal transmitted from the other apparatus is received by the antenna section 1. The signal interruption section 11 causes an antenna input (reception signal) from the antenna section 1 to pass through and the reception signal is input to the reception section 4 via the filter section 2 and the switching device 3. The reception signal input to the reception section 4 is converted to the baseband signal by using the LO signal used by the transmission section 5, and then is input to the demodulation section 8. The demodulation section 8 demodulates the reception signal and outputs the phase information to the distance measuring section 9. The distance measuring section 9 calculates a distance between the apparatus itself and the other apparatus based on a phase of the transmitted distance measuring signal and the phase of the reception signal of the apparatus itself and the other apparatus. In the case, the distance measuring section 9 performs the distance measurement computation in which the delay phase of the filter section 2 obtained in step S5 is removed. Thereby, in the distance measuring section 9, it is possible to perform an accurate distance measurement in which an influence of the delay phase of the filter section 2 is not received.

As described above, according to the present embodiment, on the occasion of the calibration for removing an influence of the delay phase of the filter section, the connection between the antenna section and the filter section is interrupted by the signal interruption section. Therefore, even in the case where the interfering wave including a band of the calibration signal is input from the antenna, it is possible to accurately measure the delay phase of the filter section. Thereby, it is possible to perform an accurate distance measurement computation in which an influence due to the delay phase of the filter section is removed.

Second Embodiment

Figure 9:
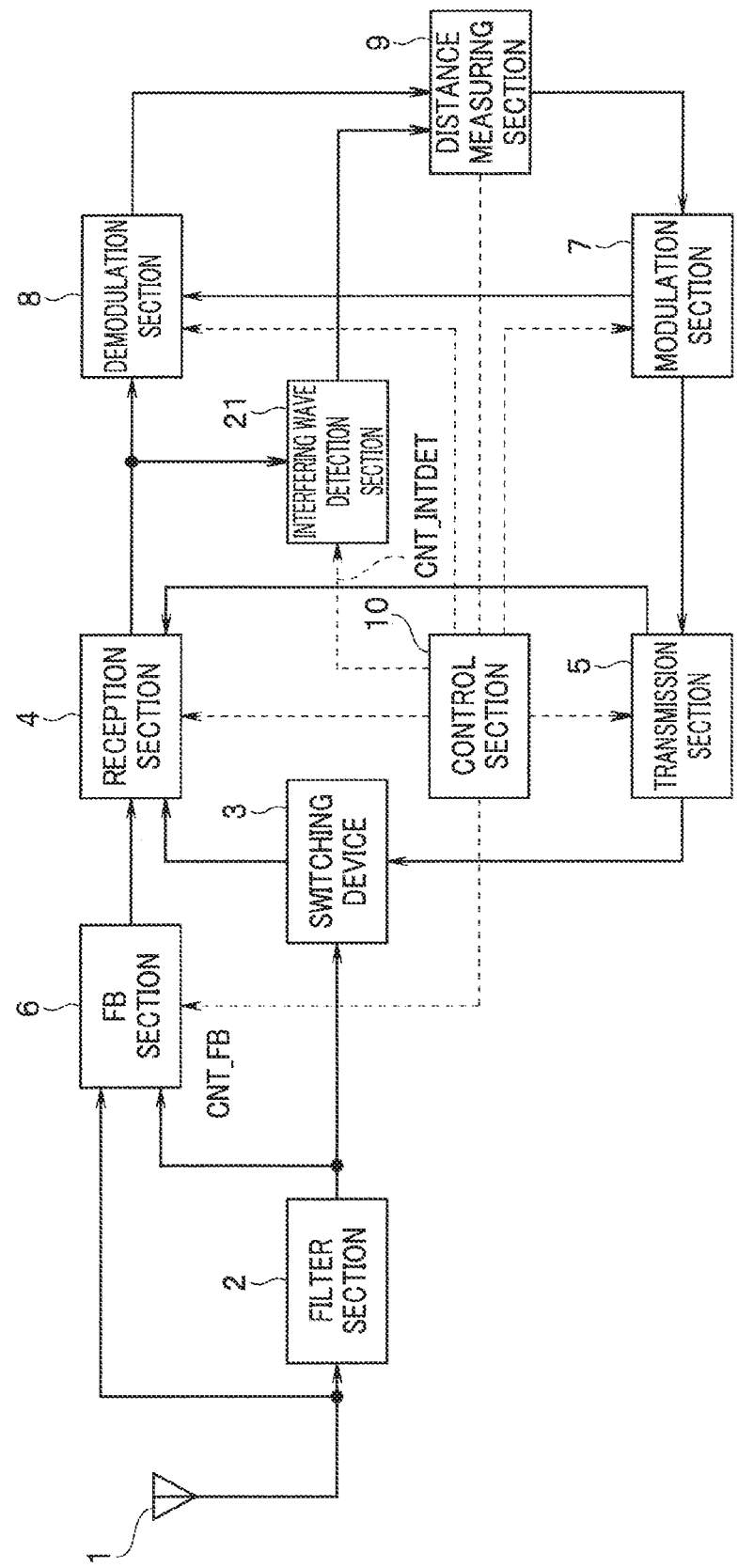
FIG. 9 is a block diagram showing a second embodiment of the present invention.

FIG. 9 is a block diagram showing a second embodiment of the present invention. In FIG. 9, the same components as the components shown in FIG. 1 are denoted by the same reference numerals, and redundant description of those components is omitted.

The present embodiment differs from the first embodiment in that the signal interruption section 11 is omitted and an interfering wave detection section 21 is adopted. The interfering wave detection section 21 is controlled by a control signal CNT_INTDET from the control section 10 and detects a signal strength of a signal output from the reception section 4. The interfering wave detection section 21 outputs, to the distance measuring section 9, a detection result whether or not the detected signal strength is equal to or larger than a predetermined threshold.

The control section 10 sets a period (transmission zone) in which the calibration signal is transmitted and a period (hereinafter, referred to as a non-signal zone) in which the calibration signal is not transmitted as a period (calibration zone) in which the calibration is performed. Further, in the non-signal zone, the control section 10 outputs the control signal CNT_INTDET so as to perform a detection of the signal strength.

In a case where the signal strength detected by the interfering wave detection section 21 is equal to or larger than a predetermined threshold, it is supposed that the calibration is not normally performed due to an influence of the interfering wave. Therefore, the distance measuring section 9 may discard a calibration result or postpone an implementation of the calibration.

Figure 10:
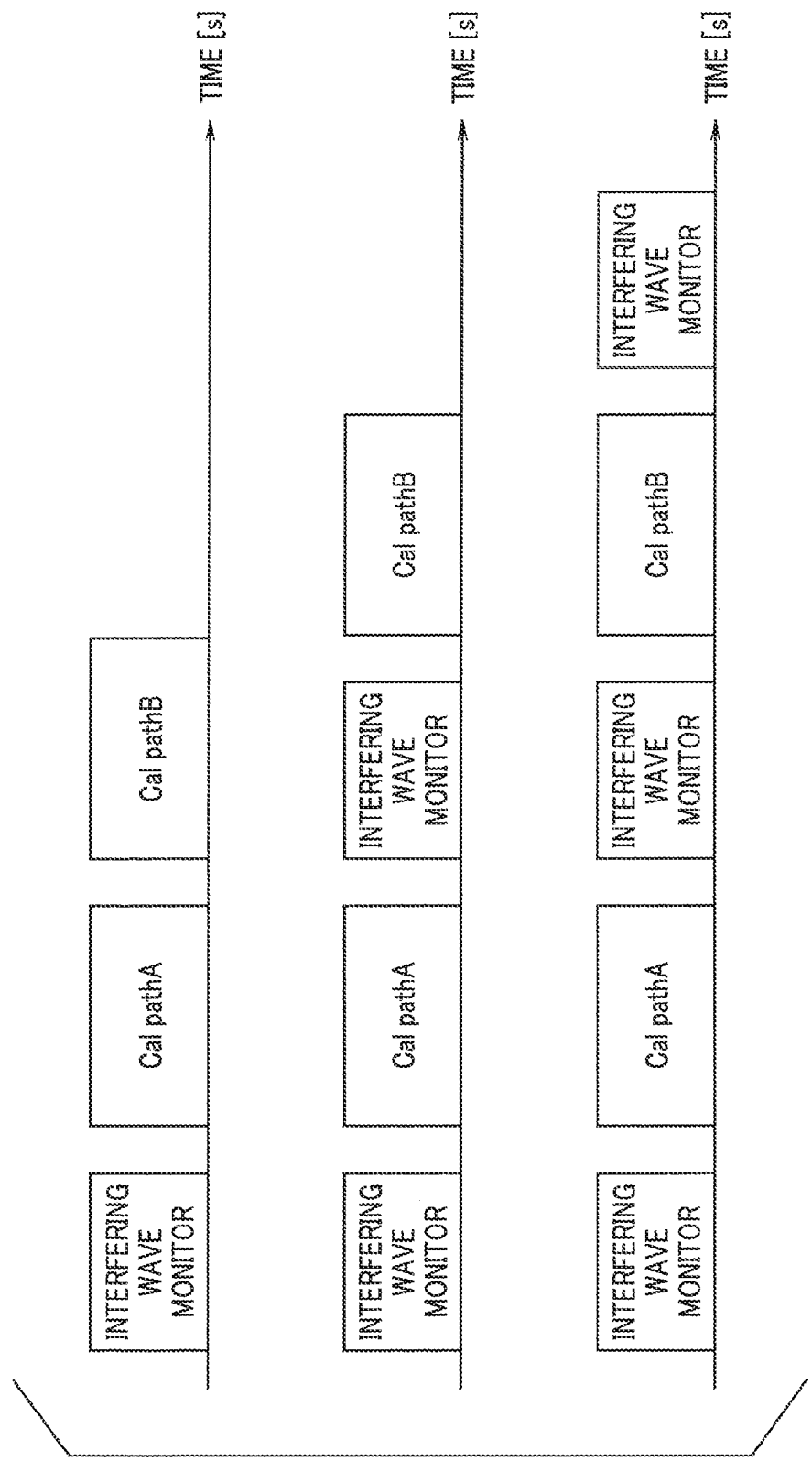
FIG. 10 is a timing chart describing operations in a calibration interval.

Next, operations according to the embodiment configured as described above will be described with reference to FIG. 10. FIG. 10 is a timing chart describing operations in the calibration zone.

An upper stage shown in FIG. 10 shows an example in which a detection of the interfering wave is performed before transmitting the calibration signal using the calibration path A. In the example, the control section 10 outputs the control signal CNT_INTDET to the interfering wave detection section 21 at the beginning of the calibration zone and performs the detection of the interfering wave (interfering wave monitor). The control section 10 sets the non-signal zone in which the distance measuring section 9 is not caused to output the calibration signal when detecting the interfering wave. Thereby, the reception section 4 receives the interfering wave received by the antenna section 1. The interfering wave detection section 21 outputs, to the distance measuring section 9, a detection result whether or not the signal strength of the interfering wave is equal to or larger than a predetermined threshold.

Next, the control section 10 performs the phase detection using the calibration path A (Cal path A), and then, performs the phase detection using the calibration path B (Cal path B). Note that Cal path A is the same processing as the processing of the calibration in step S3 of FIG. 8. and Cal path B is the same processing as the processing of the calibration in step S4 of FIG. 8. The distance measuring section 9 obtains the delay phase (calibration result) of the filter section 2 by the phase detection results using the calibration paths A and B.

In a case where it is shown that the signal strength detected by the interfering wave detection section 21 is equal to or larger than a predetermined threshold in the non-signal zone, the distance measuring section 9 discards the calibration result supposing that the interfering wave is present. Note that in the case where the interfering wave is present, the control section 10 may perform the calibration again. Further, the control section 10 may omit the phase detection by the calibration paths A and B in the upper stage shown in FIG. 10 and perform control of the upper stage shown in FIG. 10 again after the predetermined time period.

According to the present embodiment, it is necessary to perform the interfering wave monitor in the non-signal zone in a period different from the transmission zone of the calibration signal. Further, it is impossible to definitely determine whether or not the interfering wave is present in the transmission zone. However, a time difference between the interfering wave monitor zone and the transmission zone is made sufficiently small. Thereby, it is considered that mixing of the interfering wave in the transmission zone can be estimated with sufficient accuracy by detecting the signal strength in the interfering wave monitor zone.

A middle stage shown in FIG. 10 shows an example in which an implementation is performed in the order corresponding to the interfering wave monitor, the Cal path A, the interfering wave monitor, and the Cal path B in the calibration zone. In the example, in comparison to the example in the upper stage shown in FIG. 10, a time difference between the interfering wave monitor and the Cal path B becomes smaller and it is possible to cause an estimation accuracy in the mixing of the interfering wave to be improved in the transmission zone of the Cal path B.

Further, a lower stage shown in FIG. 10 shows an example in which an implementation is performed in the order corresponding to the interfering wave monitor, the Cal path A, the interfering wave monitor, the Cal path B, and the interfering wave monitor in the calibration zone. In the example, even if the interfering wave is mixed when performing the Cal path B, a possibility that the interfering wave can be detected by the interfering wave monitor becomes high. In other words, in the example in the lower stage shown in FIG. 10, the number of times of the interfering wave monitor is increased, and thereby in the case where the interfering wave is present during the calibration, it is possible to cause a detection accuracy of the interfering wave to be improved.

Note that, even in any example shown in FIG. 10, a time difference between the transmission zone and the non-signal zone is desirably small as much as possible.

According to the embodiment configured as described above, in the calibration zone, the non-signal period in which the calibration signal is not transmitted is set and a signal strength is detected during the non-signal period. Thereby, it is possible to determine whether or not an influence of the interfering wave is received and it is possible to adopt only a calibration result in which an influence of the interfering wave is not received. In this way, also, according to the present embodiment, it is possible to obtain the same effects as the effects of the first embodiment.

Note that, according to the present embodiment, an example is described in which a level of the interfering wave included in an output of the reception section 4 is detected. Further, the level of the interfering wave may be detected from an output of the demodulation section 8.

Third Embodiment

Figure 11:
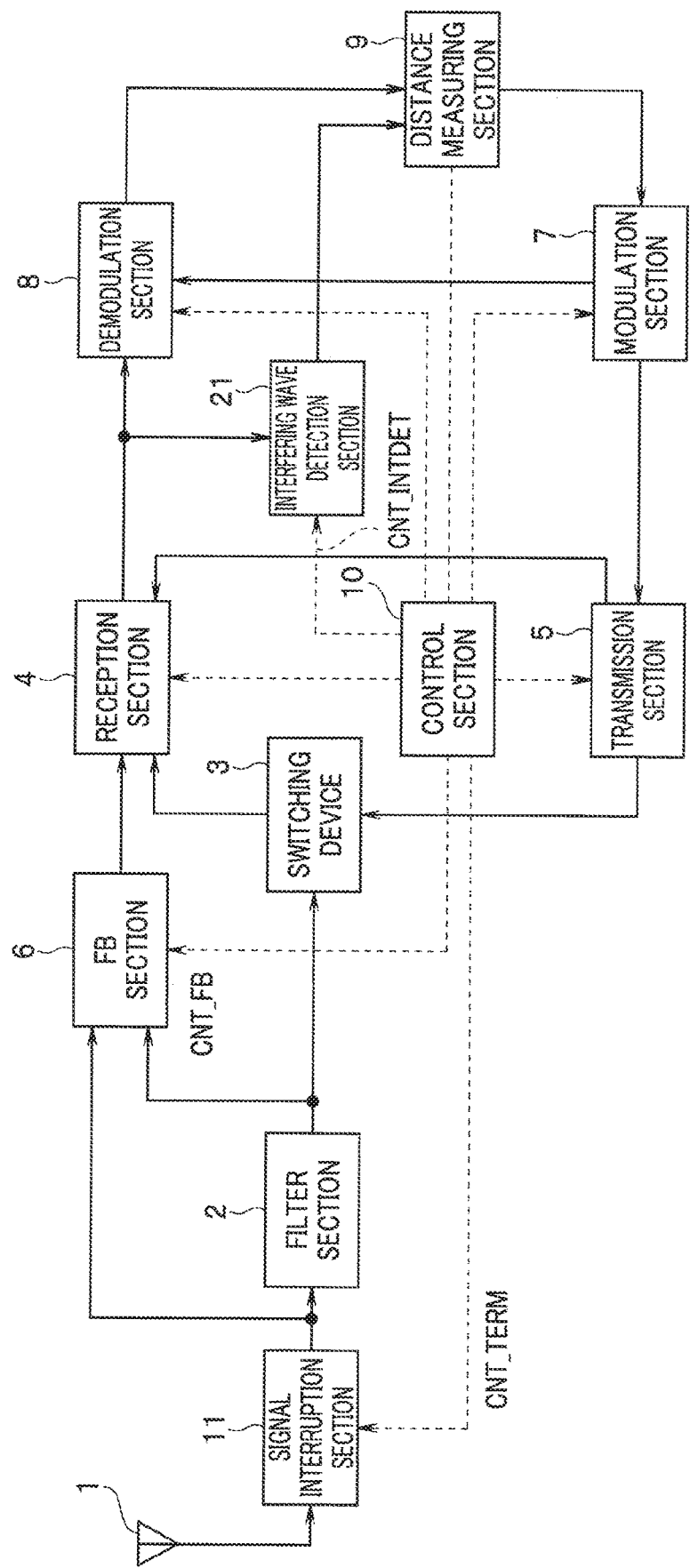
FIG. 11 is a block diagram showing a third embodiment of the present invention.

FIG. 11 is a block diagram showing a third embodiment of the present invention. In FIG. 11, the same components as the components shown in FIGS. 1 and 9 are denoted by the same reference numerals, and redundant description of those components is omitted.

According to the present embodiment, the first embodiment and the second embodiment are combined and both of the signal interruption section 11 and the interfering wave detection section 21 are provided.

According to the embodiment configured as described above, the same control as the control shown in FIG. 10 is performed in the calibration zone. At the same time, the antenna section 1 and the filter section 2 are interrupted by the signal interruption section 11 in the Cal path A and the Cal path B. In a case where an isolation by the three-terminal switch 11a configuring the signal interruption section 11 is not perfect, the interfering wave is input to the FB section 6 via the three-terminal switch 11a from the antenna section 1 to be synthesized with the calibration signal. In the case, a deterioration in the delay phase is caused as shown in the above equation (5). In other words, it is considered that in the case where an amplitude of the interfering wave is small, $\theta_{det\_int}$ the above equation (5) can be approximated to $\theta_{det}$ in the above equation (6). On the other hand, in the case where an amplitude of the interfering wave is large, an accuracy of the calibration is deteriorated.

Even in the case, according to the present embodiment, since the level of the interfering wave is detected by the interfering wave detection section 21, a level of an interference can be determined. When a mixing level of the interfering wave is equal to or higher than a predetermined threshold, the calibration result is discarded, for example. Further, if necessary, the calibration is performed again.

As described above, in the present embodiment, the first embodiment and the second embodiment are combined and it is possible to more definitely perform an accurate calibration.

Fourth Embodiment

Figure 12:
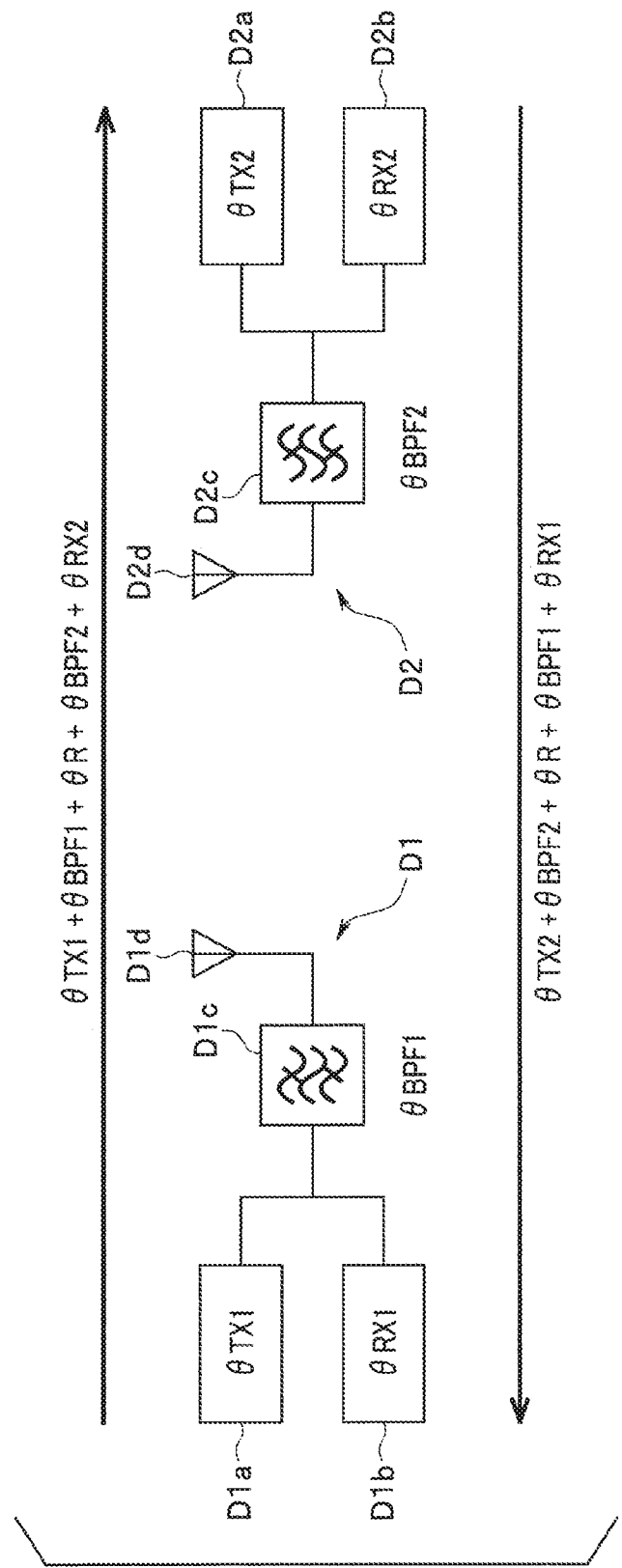
FIG. 12 is an explanatory diagram showing a fourth embodiment of the present invention.
Figure 13:
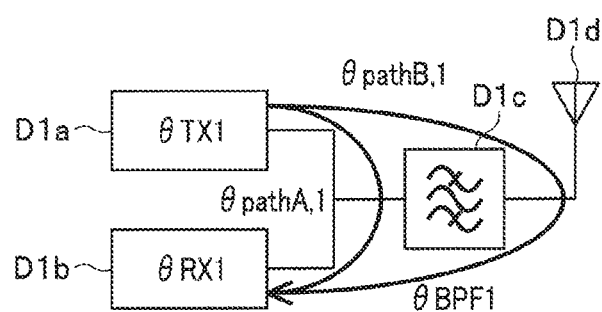
FIG. 13 is an explanatory diagram showing the fourth embodiment of the present invention.
Figure 14:
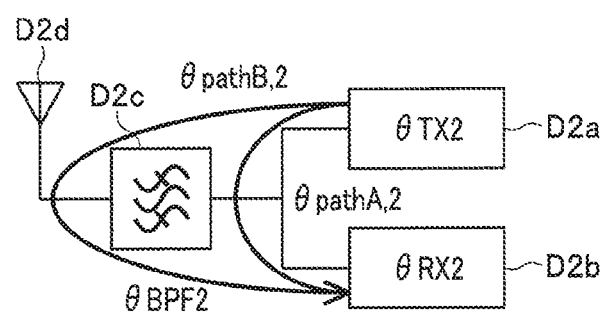
FIG. 14 is an explanatory diagram showing the fourth embodiment of the present invention.

FIG. 12 to FIG. 14 are explanatory diagrams showing a fourth embodiment of the present invention. Each of the above embodiments describes that the delay phase of the filter section 2 is measured and the delay phase of the filter section 2 is removed from phases of the transmission and reception signals to thereby perform an accurate distance measurement. Further, according to each of the above embodiments, it is possible to compensate not only the delay phase of the filter section 2 but also the entire delay elements such as parts incorporated in the apparatus. The present embodiment describes the compensation.

FIG. 12 to FIG. 14 show transmission and reception at the time of the distance measurement and the calibration in which a distance measurement technique disclosed in the document 1 is adopted. Either of apparatuses D1 and D2 is the same apparatus as the apparatus according to each of the above embodiments and has a configuration that includes the antenna section 1, the filter section 2, the switching device 3, the reception section 4, the transmission section 5, the FB section 6, the modulation section 7, the demodulation section 8, the distance measuring section 9, and the control section 10 and at the same time includes at least one of the signal interruption section 11 and the interfering wave detection section 21. Note that, in FIG. 12 to FIG. 14, a configuration on the transmission side is shown by transmission devices D1a and D2a, a configuration on the reception side is shown by reception devices D1b and D2b, a configuration of the filter section 2 is shown by filter sections D1c and D2c, and a configuration of the antenna section 1 is shown by antenna sections D1d and D2d. Note that the FB section 6, the signal interruption section 11, and the interfering wave detection section 21 are not shown in the figures.

A distance measuring signal from the transmission device D1a of the apparatus D1 is transmitted from the antenna section Did via the filter section Dc. The distance measuring signal is received by the antenna section D2d of the apparatus D2 and is received by the reception device D2b via the filter section D2c to thereby obtain a phase. Further, a distance measuring signal from the transmission device D2a of the apparatus D2 is transmitted from the antenna section D12 via the filter section D2c. The distance measuring signal is received by the antenna section D1d of the apparatus D1 and is received by the reception device D1b via the filter section D1c to thereby obtain a phase. A distance between the apparatus D1 and the apparatus D2 is obtained by using a calculation using information about the phase obtained by the apparatus D1 and the apparatus D2.

Here, a delay phase from the FB section 6 to the demodulation section 8 in the apparatus D1 is defined as $\theta_{RX1}$ and a delay phase from the modulation section 7 to the transmission section 5 is defined as $\theta_{TX1}$. Further, a delay phase from the FB section 6 to the demodulation section 8 in the apparatus D2 is defined as $\theta_{RX2}$ and a delay phase from the modulation section 7 to the transmission section 5 is defined as $\theta_{TX2}$. Further, delay phases of the filter sections D1c and D2c are defined as $\theta_{BPF1}$ and $\theta_{BPF2}$, respectively, and a delay due to a propagation of the distance measuring signal between the apparatus D1 and the apparatus D2 is defined as $\theta_R$.

The sum of the delay phases of the distance measuring signal from the apparatus D1 to the apparatus D2 is equal to $\theta_{TX1}+\theta_{BPF1}+\theta_R+\theta_{BPF2}+\theta_{RX2}$ as shown in FIG. 12. Further, the sum of the delay phases of the distance measuring signal from the apparatus D2 to the apparatus D1 is equal to $\theta_{TX2}+\theta_{BPF2}+\theta_R+\theta_{BPF1}+\theta_{RX1}$.

It is necessary to remove the delay phases other than $\theta_R$ from the distance measurement computation. Since the distance measuring signal goes back and forth between the apparatus D1 and the apparatus D2, a delay phase $\theta_{cal}$ of the sum to be removed is represented by the following equation (7).

$$\theta_{cal}=\theta_{TX1}+\theta_{RX1}+2\theta_{BPF1}+\theta_{TX2}+\theta_{RX2}+2\theta_{BPF2} \quad (7)$$

Note that the delay phases of the filter sections D1c and D2c are doubled. The reason is that a delay at the time of transmission and a delay at the time of reception are added to each other in the same apparatus.

Next, a method for calculating the above equation (7) will be described with reference to FIG. 13 and FIG. 14.

In the apparatus D1, when phases to be detected are defined as $\theta_{pathA,1}$ and $\theta_{pathB,1}$, respectively, using the calibration path A passing through the filter section D1c and the calibration path B not passing through the filter section D1c, the following equations (8) and (9) hold.

$$\theta_{pathA,1}=\theta_{TX1}+\theta_{BPF1}+\theta_{RX1} \quad (8)$$

$$\theta_{pathB,1}=\theta_{TX1}+\theta_{RX1} \quad (9)$$

In the same manner, in the apparatus D2, when phases to be detected are defined as $\theta_{pathA,2}$ and $\theta_{pathB,2}$, respectively, using the calibration path A and the calibration path B, the following equations (10) and (11) hold.

$$\theta_{pathA,2}=\theta_{TX2}+\theta_{BPF2}+\theta_{RX2} \quad (10)$$

$$\theta_{pathB,2}=\theta_{TX2}+\theta_{RX2} \quad (11)$$

Here, equation (9) is subtracted from a result in which equation (8) is doubled and equation (11) is subtracted from a result in which equation (10) is doubled. Further, when respective subtraction results are added to each other, the following equation (12) is obtained.

$$(8)\times2-(9)+(10)\times2-(11)=\theta_{TX1}+\theta_{RX1}+2\theta_{BPF1}+\theta_{TX2}+\theta_{RX2}+2\theta_{BPF2} \quad (12)$$

The above equation (12) is equal to the above equation (7). Accordingly, the above calculation is performed, and thereby it is possible to compensate not only the delay phase of the filter section 2 (D1c, D2c) but also the delay phase including the delay phase of the entire transmission and reception circuit.

According to the present embodiment configured as described above, the apparatus D1 transmits the distance measuring signal to the apparatus D2, and at the same time receives the distance measuring signal from the apparatus D2. Further, the apparatus D2 transmits the distance measuring signal to the apparatus D1, and at the same time receives the distance measuring signal from the apparatus D1. At least one of the apparatuses D1 and D2 imparts a phase detection result of the reception signal to the apparatuses D2 and D1. Thereby, at least one of the apparatuses D1 and D2 is capable of performing a distance measurement computation between the apparatus D1 and the apparatus D2.

In the distance measurement computation, according to the present embodiment, $\theta_{cal}$ is removed from phases of the transmission and reception signals of the distance measuring signal. In other words, according to the present embodiment, at least one of the apparatuses D1 and D2 imparts information about the delay phase of the calibration path A and the delay phase of the calibration path B to the apparatuses D2 and D1 of communication partners. Thereby, by the computation of the above equation (12), at least one of the apparatuses D1 and D2 calculates the delay phase $\theta_{cal}$ removed from the distance measurement computation and compensates the phase information by using the delay phase $\theta_{cal}$ to thereby perform an accurate distance measurement.

According to the present embodiment as described above, by using phase detection results of the calibration path passing through the filter section and the calibration path not passing through the filter section, phases of transmission and reception signals of the distance measuring signal are compensated to thereby perform an accurate distance measurement in which a delay of each section in the apparatus is canceled.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A distance measuring apparatus comprising:
a transmission processing section configured to output a transmission signal;
an antenna section configured to transmit the transmission signal and receive a reception signal;
a reception processing section configured to receive the reception signal or the transmission signal;
a filter section configured to perform band limitation on the transmission signal input from one terminal and output the transmission signal from another terminal, and to perform band limitation on the reception signal from the antenna section input from the other terminal and output the reception signal from the one terminal;
a distance measuring section configured to perform a distance measurement computation based on the transmission signal transmitted from the transmission processing section and the reception signal received by the reception processing section, and to obtain a delay of a signal passing through the filter section and perform calibration of the distance measurement computation;
a signal interruption section configured to interrupt transmission of a signal between the other terminal of the filter section and the antenna section;
a control section configured to control the signal interruption section to interrupt the transmission of the signal between the antenna section and the other terminal of the filter section during a period of the calibration; and an interfering wave detection section configured to detect whether or not an interfering wave is received by the antenna section depending on a level of the reception signal received by the reception processing section, wherein in a case where it is detected by the interfering wave detection section that the interfering wave is received, the control section controls the distance measuring section not to perform the calibration.

2. The distance measuring apparatus according to claim 1, further comprising a feedback section configured to switch a first path directly supplying the transmission signal output from the transmission processing section to the reception processing section and a second path supplying the transmission signal output from the transmission processing section from the other terminal of the filter section to the reception processing section via the filter section, wherein the distance measuring section performs measurement of a first delay of the transmission signal through the first path and measurement of a second delay of the transmission signal through the second path, obtains a delay of the filter section, and performs the calibration of the distance measurement computation.

3. The distance measuring apparatus according to claim 1, wherein the distance measuring section obtains a delay of the transmission signal in at least one of the transmission processing section and the reception processing section.

4. The distance measuring apparatus according to claim 2, wherein the distance measuring section obtains a delay of the transmission signal in at least one of the transmission processing section and the reception processing section.

5. The distance measuring apparatus according to claim 2, wherein in a case where it is detected by the interfering wave detection section that the interfering wave is received, the control section controls the distance measuring section not to adopt measurement results of the first and second delays obtained by the distance measuring section for the calibration.

6. The distance measuring apparatus according to claim 5, wherein in a case where it is detected by the interfering wave detection section that the interfering wave is received, the control section causes the distance measuring section to perform the measurement of the first and second delays again.

7. The distance measuring apparatus according to claim 5, wherein the control section causes the interfering wave detection section to detect the interfering wave during a period other than measurement periods of the first and second delays.

8. The distance measuring apparatus according to claim 5, wherein the control section causes the interfering wave detection section to detect the interfering wave during at least one period of a period between a measurement period of the first delay and a measurement period of the second delay and periods before and after the measurement periods of the first and second delays.

9. The distance measuring apparatus according to claim 1, wherein the signal interruption section includes:
a terminator; and
a switch configured to be controlled by the control section and to selectively connect one of the antenna section and the terminator to the other terminal of the filter section.

10. A distance measuring system comprising:
a first apparatus including a same configuration as the configuration of the distance measuring apparatus according to claim 2; and
a second apparatus including the same configuration as the configuration of the distance measuring apparatus according to claim 2, wherein
the distance measuring section of the first apparatus performs calibration of the distance measurement computation based on measurement results of the first and second delays with regard to the first apparatus and measurement results of the first and second delays with regard to the second apparatus.

11. A distance measuring apparatus comprising:
a transmission processing section configured to output a transmission signal;
an antenna section configured to transmit the transmission signal and receive a reception signal;
a reception processing section configured to receive the reception signal or the transmission signal;
a filter section configured to perform band limitation on the transmission signal input from one terminal and output the transmission signal from another terminal, and to perform band limitation on the reception signal from the antenna section input from the other terminal and output the reception signal from the one terminal;
a distance measuring section configured to perform a distance measurement computation based on the transmission signal transmitted from the transmission processing section and the reception signal received by the reception processing section, and to obtain a delay of the filter section and perform calibration of the distance measurement computation;
an interfering wave detection section configured to detect whether or not an interfering wave is received by the antenna section depending on a level of the reception signal received by the reception processing section; and
a control section configured to perform the calibration in a case where it is not detected by the interfering wave detection section that the interfering wave is received.

12. The distance measuring apparatus according to claim 11, further comprising a feedback section configured to switch a first path directly supplying the transmission signal output from the transmission processing section to the reception processing section and a second path supplying the transmission signal output from the transmission processing section from the other terminal of the filter section to the reception processing section via the filter section, wherein the distance measuring section performs measurement of a first delay of the transmission signal through the first path and measurement of a second delay of the transmission signal through the second path, obtains a delay of the filter section, and performs the calibration of the distance measurement computation, and in a case where it is detected by the interfering wave detection section that the interfering wave is received, the control section does not adopt a measurement result of the delay of the filter section obtained by the distance measuring section for the calibration.

* * * * *